United States Patent [19]

Shiraishi

[11] Patent Number: 5,051,908
[45] Date of Patent: Sep. 24, 1991

[54] DRIVING WHEEL TORQUE CONTROL DEVICE FOR VEHICLE

[75] Inventor: Shuji Shiraishi, Wako, Japan

[73] Assignee: Honda Giken Kogyo Kabushiki Kaisha, Tokyo, Japan

[21] Appl. No.: 341,187

[22] Filed: Apr. 21, 1989

[30] Foreign Application Priority Data

Apr. 22, 1988 [JP] Japan .................................. 63-099879
Apr. 22, 1988 [JP] Japan .................................. 63-099880

[51] Int. Cl.$^5$ ........................... B60T 8/32; B60K 31/00
[52] U.S. Cl. ......................... 364/426.02; 364/426.03; 180/197; 303/100
[58] Field of Search ................ 364/426.02, 426.01, 364/426.03, 456, 454; 180/197; 303/95, 100, 106, 112, 103

[56] References Cited

U.S. PATENT DOCUMENTS

| 4,180,223 | 12/1979 | Amberg | 303/107 |
| 4,760,893 | 8/1988 | Sigl et al. | 180/197 |
| 4,767,588 | 8/1988 | Ito | 180/143 |
| 4,773,012 | 9/1988 | Ito et al. | 180/142 |
| 4,809,181 | 2/1989 | Ito et al. | 364/426.01 |
| 4,809,183 | 2/1989 | Eckert | 303/95 |
| 4,933,856 | 6/1990 | Leiber | 180/197 |
| 4,933,857 | 6/1990 | Hashiguchi et al. | 364/426.02 |

FOREIGN PATENT DOCUMENTS 1232952 10/1986 Japan .

Primary Examiner—Allen R. MacDonald
Assistant Examiner—Ayaz R. Sheikh
Attorney, Agent, or Firm—Armstrong, Nikaido, Marmelstein, Kubovcik, & Murray

[57] ABSTRACT

A first driving wheel torque reduction control quantity is set by a first setting element according to a slip condition of a driving wheel, and a second driving wheel torque reduction control quantity is set by a second setting element according to a yaw motion condition and a reference value of the yaw motion condition. Then, a driving wheel torque is reduced according to the first and second driving wheel torque reduction control quantities. In another aspect, a driving wheel slip reference value is corrected by a correction value to be set according to the yaw motion condition and the reference value of the yaw motion condition. Then, the slip condition is detected according to the driving wheel slip reference value corrected above.

4 Claims, 4 Drawing Sheets

DRIVING WHEEL TORQUE CONTROL DEVICE FOR VEHICLE

BACKGROUND OF THE INVENTION

The present invention relates to a driving wheel torque control device for a vehicle including slip control quantity setting means for setting a driving wheel torque reduction control quantity according to a slip condition of a driving wheel of the vehicle with respect to a driving direction.

Conventionally, such a control device is known from Japanese Patent Publication No. 52-198, for example.

In the conventional control device, a slip condition of the driving wheel is detected, and a driving torque of the driving wheel is reduced according to the slip condition detected so as to obtain a maximum driving force. A critical lateral force to be generated at the driving wheel increases with a reduction in driving force rather than the maximum driving force. Accordingly, when the vehicle is steered in detecting the slip condition and reducing the driving force, a yaw motion desired by an operator is generated, provided that a steering quantity is within a range not exceeding the critical lateral force. However, when the steering quantity is so large as to exceed the critical lateral force, the desired yaw motion is not generated. In this case, the yaw motion tends to become under-steering in a front-engine front-drive (FF) vehicle, while it tends to become over-steering in a front-engine rear-drive (FR) vehicle.

SUMMARY OF THE INVENTION

It is an object of the present invention to provide a driving wheel torque control device which may exhibit a desired yaw motion with a reduction in effective driving force being suppressed in consideration of a yaw motion condition and a slip condition.

According to a first aspect of the present invention, there is provided a driving wheel torque control device for a vehicle, comprising first setting means for setting a first driving wheel torque reduction control quantity according to a slip condition of a driving wheel of said vehicle with respect to a driving direction; means for detecting a yaw motion condition of said vehicle; means for generating a reference value of said yaw motion condition of said vehicle; second setting means for setting a second driving wheel torque reduction control quantity according to said yaw motion condition and said reference value of said yaw motion condition; and means for deciding a final driving wheel torque reduction control quantity according to said first and second driving wheel torque reduction control quantities generated from said first and second setting means, respectively.

With this arrangement, the first driving wheel torque reduction control quantity is set by the first setting means according to the slip condition, and the second driving wheel torque reduction control quantity is set by the second setting means according to the yaw motion condition and the reference value of the yaw motion condition. Then, the driving wheel torque is reduced according to the first and second driving wheel torque reduction control quantities. Therefore, the driving torque may be controlled in consideration of a steering quantity of the vehicle to thereby regulate the critical lateral force according to the steering quantity. Thus, a desired yaw motion may be obtained with a reduction in effective driving force being suppressed.

According to a second aspect of the present invention, there is provided a driving wheel torque control device for a vehicle, comprising means for setting a driving wheel slip reference value for detection of a slip condition of a driving wheel of said vehicle with respect to a driving direction; means for setting a driving wheel torque reduction control quantity according to said slip condition of said driving wheel; means for detecting a yaw motion condition of said vehicle; means for generating a reference value of said yaw motion condition of said vehicle; and means for setting a correction value for correcting said driving wheel slip reference value according to said yaw motion condition and said reference value of said yaw motion condition.

With this arrangement, the driving wheel slip reference value is corrected by the correction value to be set according to the yaw motion condition and the reference value of the yaw motion condition. Then, the slip condition is detected according to the driving wheel slip reference value corrected above. Therefore, the driving torque may be controlled in consideration of a steering quantity of the vehicle to thereby regulate the critical lateral force according to the steering quantity. Thus, a desired yaw motion may be obtained with a reduction in effective driving force being suppressed.

Other objects and features of the invention will be more fully understood from the following detailed description and appended claims when taken with the accompanying drawings.

DETAILED DESCRIPTION OF THE PREFERRED EMBODIMENTS

Figure 1:
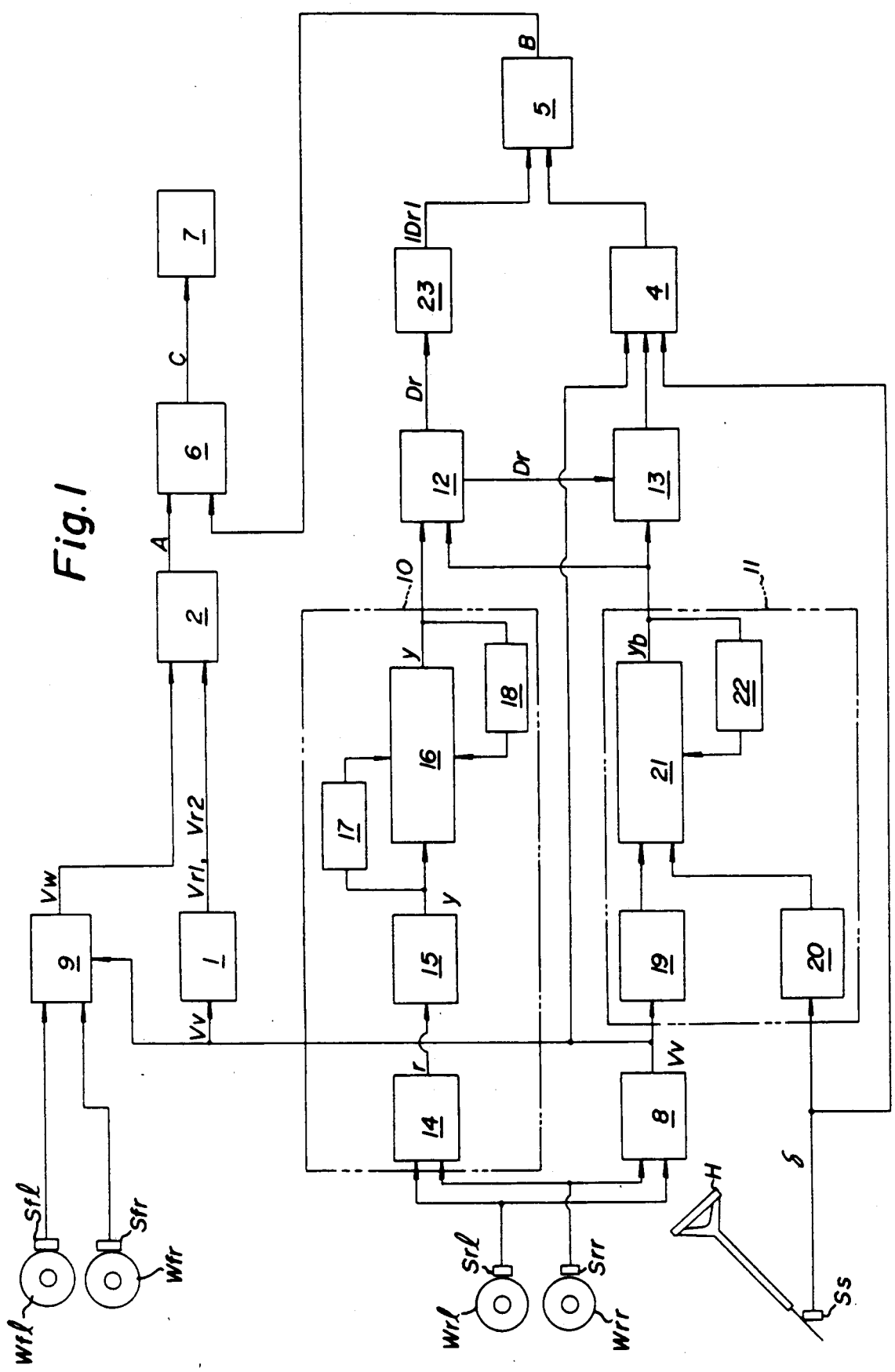
FIG. 1 is a block diagram of a first preferred embodiment of the driving wheel torque control device according to the present invention.

There will now be described a preferred embodiment of the present invention with reference to the drawings. Referring to FIG. 1, the driving wheel torque control device of the preferred embodiment is applied to a front-engine front-drive vehicle (FF vehicle), which device includes driving wheel slip reference value setting means 1 for setting first and second reference wheel speeds $V_{r1}$ and $V_{r2}$ as reference values for detection of slip condition of left and right front wheels $W_{fl}$ and $W_{fr}$ as driving wheels of the vehicle with respect to a driving direction of the driving wheels; slip control quantity setting means 2 for setting a driving wheel torque reduction control quantity A according to the slip condition detected on the basis of the reference wheel speeds $V_{r1}$ and $V_{r2}$; yaw rate detecting means 10 as yaw motion condition detecting means for detecting a yaw motion condition of the vehicle; reference yaw rate setting means 11 as yaw motion reference value generating means for generating a reference value of the yaw motion condition; yaw motion control quantity setting means 5 for setting a driving wheel torque reduction control quantity B according to signals from the yaw rate detecting means 10 and the reference yaw rate setting means 11; final control quantity deciding means 6 for deciding a final driving wheel torque reduction control quantity C according to the control quantities A and B generated from the slip control quantity setting means 2 and the yaw motion control quantity setting means 5, respectively; and driving wheel torque reducing means 7 for reducing driving torques of the front wheels $W_{fl}$ and $W_{fr}$ in receipt of the driving wheel torque reduction control quantity C generated from the final control quantity deciding means 6.

Left and right rear wheels $W_{rl}$ and $W_{rr}$ as driven wheels of the FF vehicle are provided with independent speed sensors $S_{rl}$ and $S_{rr}$, respectively, and wheel speeds detected by the speed sensors $S_{rl}$ and $S_{rr}$ are input to a vehicle speed detector 8 and the yaw rate detecting means 10. The vehicle speed detector 8 serves to average both the driven wheel speeds and provide a vehicle speed $V_v$. The vehicle speed $V_v$ is input to a selecting circuit 9, the driving wheel slip reference value setting means 1, the reference yaw rate setting means 11 and permissible deviation setting means 4.

The left and right front wheels $W_{fl}$ and $W_{fr}$ as the driving wheels are also provided with independent speed sensors $S_{fl}$ and $S_{fr}$, respectively, and wheel speeds detected by the speed sensors $S_{fl}$ and $S_{fr}$ are input to the selecting circuit 9, wherein either of the driving wheel speeds is selected as a driving wheel speed $V_w$ according to the vehicle speed $V_v$. That is, when the vehicle speed $V_v$ is very low such as less than 4 km/h, a lower one of the driving wheel speeds is selected as the driving wheel speed $V_w$, while when the vehicle speed $V_v$ is not less than 4 km/h, a higher one of the driving wheel speeds is selected as the driving wheel speed $V_w$. Thus, the driving wheel speed $V_w$ is input to the slip control quantity setting means 2.

A steering wheel H is provided with a steering angle sensor $S_s$. A steering angle $\delta$ detected by the steering angle sensor $S_s$ is input to the reference yaw rate setting means 11 and the permissible deviation setting means 4.

Figure 2:
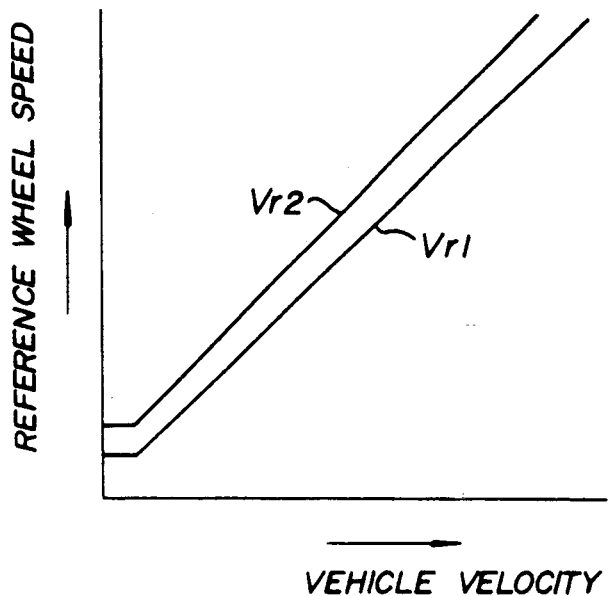
FIG. 2 is a graph showing an exemplary output characteristic of the driving wheel slip reference value setting means.

As shown in FIG. 2, the first reference wheel speed $V_{r1}$ and the second reference wheel speed $V_{r2}$ as driving wheel slip reference values are set according to the vehicle speed $V_v$ by the driving wheel slip reference value setting means 1. Thus, the driving wheel slip reference value setting means 1 generates the first and second reference wheel speeds $V_{r1}$ and $V_{r2}$ according to the vehicle speed $V_v$ to be input thereto. The first reference wheel speed $V_{r1}$ is set according to a permissible slip rate, and the second reference wheel speed $V_{r2}$ is set according to an excess slip, which speed is greater than the first reference wheel speed $V_{r1}$.

The first and second reference wheel speeds $V_{r1}$ and $V_{r2}$ obtained by the driving wheel slip reference value setting means 1 and the driving wheel speed $V_w$ obtained by the selecting circuit 9 are input to the slip control quantity setting means 2. The slip control quantity setting means 2 serves to set a driving wheel torque reduction control quantity A according to a slip condition on the basis of the first and second reference wheel speeds $V_{r1}$ and $V_{r2}$ in accordance with the following expression.

$$A = (V_w - V_{r1})/(V_{r2} - V_{r1}) \tag{1}$$

The control quantity A is set such that the greater this value, the greater a torque reduction quantity. When $(V_w - V_{r1})$ is negative, that is, when the driving wheel speed $V_w$ is lower than the first reference wheel speed $V_{r1}$, $A = 0$ is set.

The yaw rate detecting means 10 includes a subtracting circuit 14, a multiplying circuit 15, a filter 16, a hysteresis storing circuit 17 for storing an output hysteresis of the multiplying circuit 15, and a hysteresis storing circuit 18 for storing an output hysteresis of the filter 16. The subtracting circuit 14 provides a difference r between the wheel speeds detected by the speed sensors $S_{rl}$ and $S_{rr}$, and the multiplying circuit 15 multiplies the difference r by a certain proportional constant d to obtain an approximate value $y'$ ($= r \times d$) of a yaw rate. The proportional constant d is a tread width of the driven wheels $W_{rl}$ and $W_{rr}$, which is $d = 1$, for example.

The filter 16 serves to eliminate the influence of vibration of a vehicle suspension to the wheel speeds, which is a recursive filter. Since the fluctuation of the wheel speeds due to resonance of wheel vibration and suspension vibration during running on a rough road is about 10 Hz, and a frequency range of the yaw rate employable for the control of a vehicle motion is 0–2 Hz, the filter 16 operates to filter the approximate value $y'$ of the yaw rate with a frequency range of 2 Hz or more used as a damping range. The filter 16 generates an output $y_n$ as calculated in accordance with the following expression.

$$y_n = \alpha_1 \cdot y_{n-1} + \alpha_2 \cdot y_{n-2} + \alpha_3 \cdot y_{n-3} + \beta_1 \cdot y_n' + \beta_2 \cdot y_{n-1}' + \beta_3 \cdot y_{n-2}' \tag{2}$$

where, $\alpha_1 \ldots \alpha_3$ and $\beta_1 \ldots \beta_3$ are constant determined by an experimental result, and the suffixes n, n−1 and n−3 stand for a present value, a previous value, etc. in each cycle where the calculation in filtering is repeated. A last value, a before-last value and so on of the approximate value $y'$ of the yaw rate are input from the hysteresis storing circuit 17 to the filter 16, while a last value, a before-last value and so on of the yaw rate y are input from the hysteresis storing circuit 18 to the filter 16.

Figure 3:
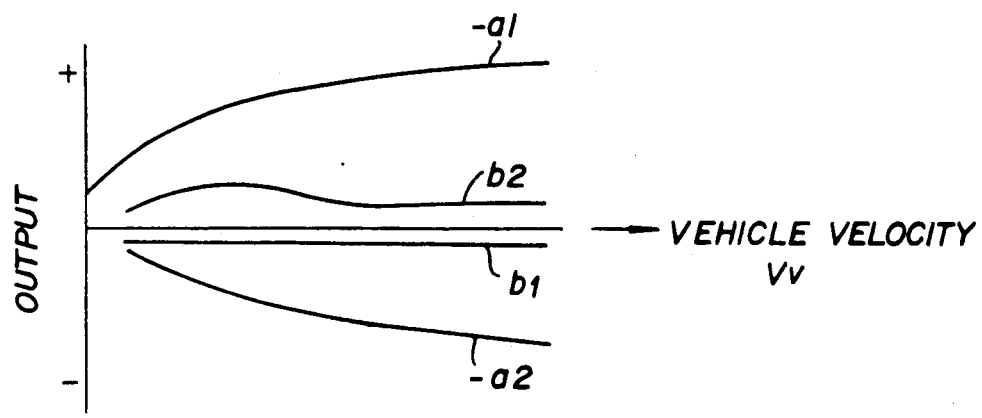
FIG. 3 is a graph showing an exemplary output characteristic of a constant selecting circuit.

The reference yaw rate setting means 11 includes a constant selecting circuit 19, a hysteresis storing circuit 20, a computing circuit 21 and a hysteresis storing circuit 22. The constant selecting circuit 19 serves to select constants $a_1$, $a_2$, $b_1$ and $b_2$ to be used in the calculation in the computing circuit 21 according to the vehicle speed $V_v$ obtained by the vehicle speed detector 8. The constants $a_1$, $a_2$, $b_1$ and $b_2$ are defined as shown in FIG. 3, for example, and they are input to the computing circuit 21 according to the vehicle speed $V_v$. The hysteresis storing circuit 20 is adapted to input the hysteresis of the steering angle $\delta$ detected by the steering angle sensor $S_s$ to the computing circuit 21. The hysteresis storing circuit 22 is adapted to input the hysteresis of outputs from the computing circuit 21, that is, the hysteresis of reference yaw rate $y_b$. The computing circuit 21 serves to calculate a reference yaw rate $y_b$ to be presently desired according to the hysteresis of the reference yaw rate $y_b$ from the hysteresis storing circuit 22 and the hysteresis of the steering angle $\delta$ from the hysteresis storing circuit 20. The reference yaw rate $y_b$ is calculated in accordance with the following expression.

$$y_b = -a_1 \cdot y_{bn-1} - a_2 \cdot y_{bn-2} + b_1 \cdot \delta_{n-1} + b_2 \cdot \delta_{n-2} \tag{3}$$

The yaw rate y obtained by the yaw rate detecting means 10 and the reference yaw rate $y_b$ obtained by the reference yaw rate setting means 11 are input to a deviation calculating circuit 12 for calculating a deviation $D_r$ ($=y-y_b$) between the yaw rate y and the reference yaw rate $y_b$. The deviation $D_r$ obtained by the deviation calculating circuit 12 is input to a steering characteristic determining circuit 13.

The steering characteristic determining circuit 13 receives the deviation $D_r$ from the deviation calculating circuit 12 and the reference yaw rate $y_b$ from the reference yaw rate setting means 11, and determines a steering characteristic according to the inputs Dr and $y_b$. That is, the criterion shown below in Table 1 is preliminarily defined in the steering characteristic determining means 13.

TABLE 1

| $D_r$ | Positive | Negative |
|---|---|---|
| $y_b$ | | |
| Positive | O | U |
| Negative | U | O |

In Table 1, symbol O stands for over-steering, and symbol U stands for under-steering. The result of determination in accordance with Table 1 is output from the steering characteristic determining circuit 13.

Figure 4:
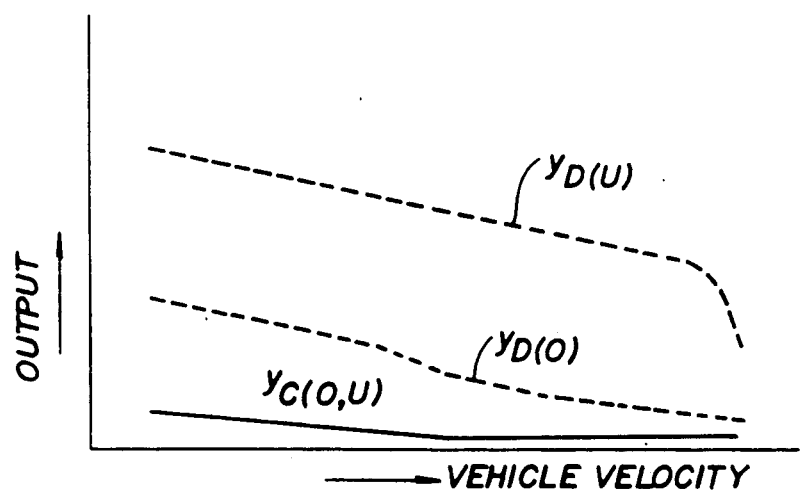
FIG. 4 is a graph showing an exemplary output characteristic of permissible deviation setting means.

The permissible deviation setting means 4 receives the vehicle speed $V_y$ from the vehicle speed detector 8, the steering angle $\delta$ from the steering angle sensor $S_s$ and a signal indicative of the determination result from the steering characteristic determining circuit 13, and generates reference values $y_D$ and $y_c$ according to these input signals. When the steering angle $\delta$ is relatively small, the reference values $y_D$ and $y_c$ are set as shown in FIG. 4 according to the vehicle speed $V_y$ and the determination result from the steering characteristic determining circuit 13. When the steering angle $\delta$ becomes relatively large, the reference values $y_D$ and $y_c$ are set to be larger than those shown in FIG. 4. The reference value $y_c$ is set corresponding to a condition where an actual steering characteristic starts to be deviated from a steering characteristic peculiar to the vehicle, while the reference value $y_D$ is set corresponding to a condition where the deviation of the actual steering characteristic from the peculiar steering characteristic becomes out of a permissible range.

The deviation $D_r$ generated from the deviation calculating circuit 12 is also input to an absolute value generating circuit 23 for generating an absolute value of the deviation $D_r$. The absolute value of the deviation $D_r$ generated from the absolute value generating circuit 23 is input to the yaw motion control quantity setting means 5. On the other hand, the reference values $y_D$ and $y_c$ generated from the permissible deviation setting means 4 are also input to the yaw motion control quantity setting means 5. The yaw motion control quantity setting means 5 calculates a driving wheel torque reduction control quantity B in accordance with the following expression.

$$B = (|D_r| - y_c)/(y_D - y_c) \quad (4)$$

where, if $(|D_r| - y_c)$ is negative, B=0 is set.

The driving wheel torque reduction control quantity B is input to the final control quantity setting means 6. On the other hand, the driving wheel torque reduction control quantity A generated from the slip control quantity setting means 2 is also input to the final control quantity setting means 6. Thus, the final control quantity setting means 6 operates to set a final driving wheel torque reduction control quantity C according to the control quantities A and B. That is, the final driving wheel torque reduction control quantity C is set in accordance with the following expression.

$$C = A + B \quad (5)$$

The final driving wheel torque reduction control quantity C is input to the driving wheel torque reducing means 7. The driving wheel torque reducing means 7 operates to reduce a driving wheel torque according to the input control quantity C. Examples of the driving wheel torque reducing means 7 may include means for reducing a fuel quantity to be supplied to an engine, means for reducing a throttle opening, a braking device, means for reducing a transmitting rate of a continuously variable transmission, and means for retarding an ignition timing of the engine or cutting ignition of the engine.

Figure 5:
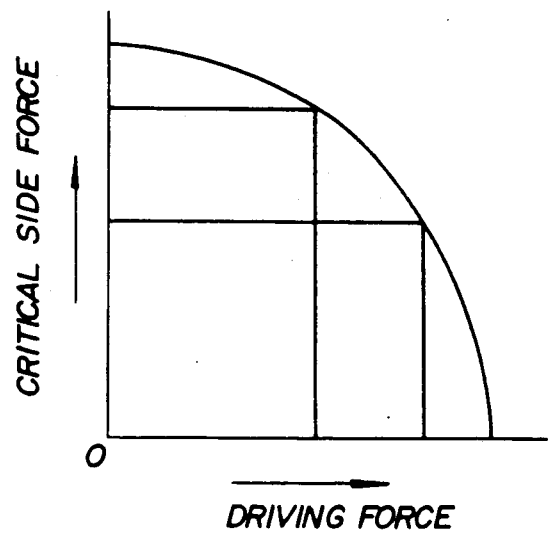
FIG. 5 is a graph showing a relation between the driving force and the critical lateral force.

FIG. 5 shows a relation between a driving force of the front wheels and a critical lateral force in the front-engine front-drive vehicle. As will be apparent from FIG. 5, the critical lateral force decreases with an increase in the driving force, and increases with a decrease in the driving force. According to the present invention, the final driving wheel torque reduction control quantity C is set according to the driving wheel torque reduction control quantity A to be set according to a slip condition of the driving wheels and the driving wheel torque reduction control quantity B to be set according to a yaw motion condition of the vehicle. Then, the driving wheel torque reducing means 7 is operated according to the final driving wheel torque reduction control quantity C to thereby reduce a driving wheel torque. Accordingly, the driving force may be reduced according to the yaw motion condition depending on a steering condition of the vehicle, thereby increasing the critical lateral force. Therefore, a yaw motion depending on a steering quantity of the steering wheel to be operated by an operator may be effected within a range of the increased critical lateral force.

In a rear-drive vehicle, the relation between the driving force and the critical lateral force exists at the rear wheels as the driving wheels. If a lateral force required for the rear wheels with respect to the driving force to be applied to the rear wheels exceeds the critical lateral force, lateral grip will be eliminated. Accordingly, it is effective to increase the critical lateral force by reducing the driving force of the rear wheels under the condition where the required lateral force is presumed to exceed the critical lateral force. Therefore, the control of the driving force and the lateral force according to the present invention is also effective in the rear-drive wheel.

As a result, the driving torque may be reduced according to a slip condition of the driving wheels to suppress a reduction in effective driving force, and simultaneously a yaw motion desired by the operator may be obtained.

In the above-mentioned preferred embodiment, the driving wheel torque reduction control quantities A and B are simply added to each other to obtain the final driving wheel torque reduction control quantity C in the final control quantity deciding means 6. In a modification, the final driving wheel torque reduction control quantity C may be defined as a square root of the sum of square values of the control quantities A and B, that is, $(A^2+B^2)^{\frac{1}{2}}$.

Further, a slip condition of the driving wheels may be detected by detecting whether or not at least one of a slip rate and a differential thereof exceeds a predetermined value, or by detecting whether or not a difference between both the driving wheel speeds exceeds a predetermined value. Further, the reference yaw rate $y_b$ may be fixed value. In this case, the steering characteristic is set according to the yaw rate and the deviation $D_r$. Additionally, a yaw motion condition may be detected by detecting a lateral acceleration of the vehicle.

Figure 6:
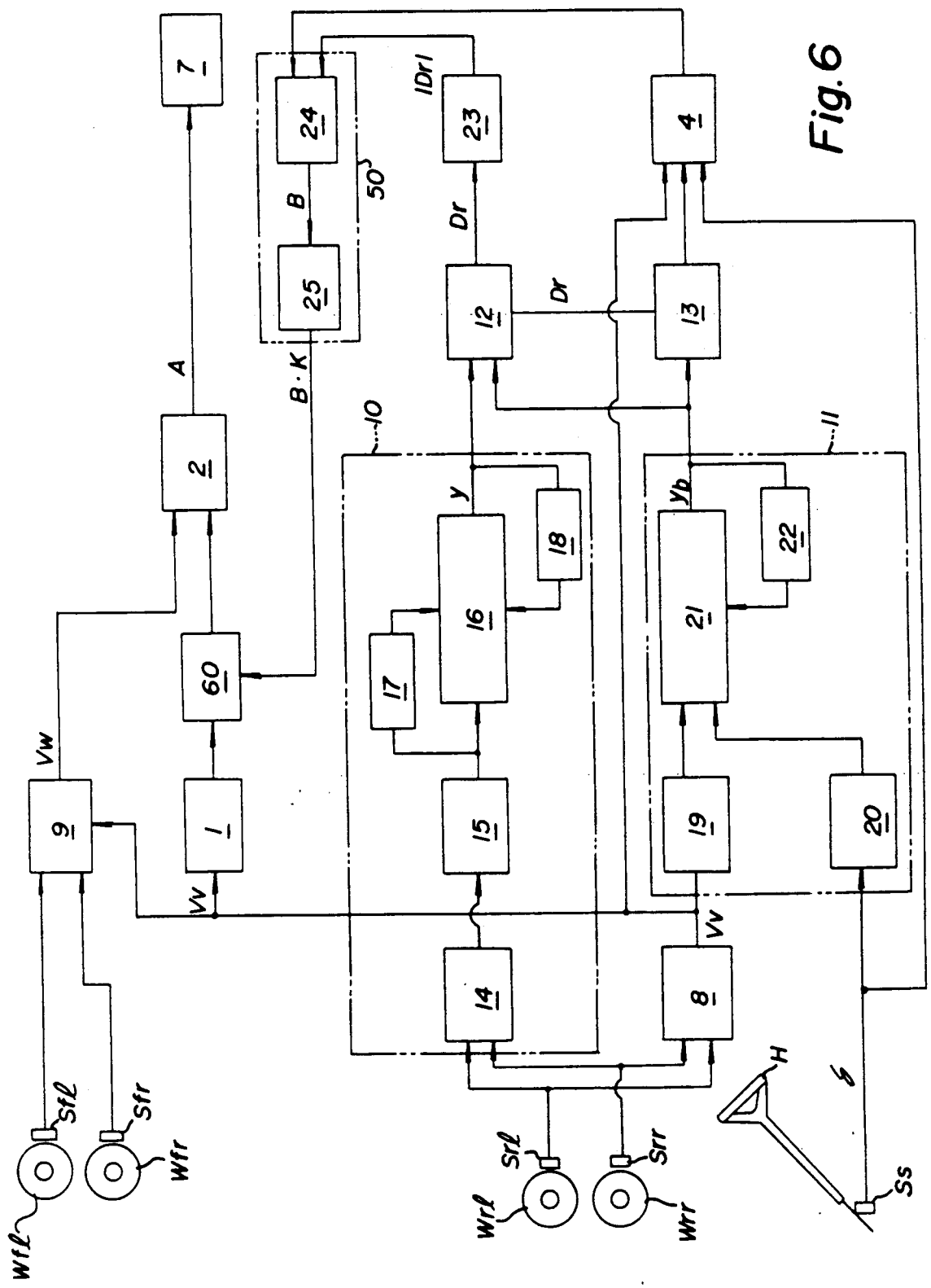
FIG. 6 is a block diagram of a second preferred embodiment of the present invention.

Referring next to FIG. 6 which shows a second preferred embodiment of the present invention, the same reference numerals as in the first preferred embodiment designate the same elements, and the explanation thereof will be omitted hereinafter.

The driving wheel torque control device of the second preferred embodiment is applied to a front-engine front-drive vehicle, which device includes driving wheel slip reference value setting means 1 for setting first and second reference wheel speeds $V_{r1}$ and $V_{r2}$ as reference values for detection of slip condition of left and right front wheels $W_{fl}$ and $W_{fr}$ as driving wheels of the vehicle with respect to a driving direction of the driving wheels; slip control quantity setting means 2 for setting a driving wheel torque reduction control quantity A according to the slip condition detected on the basis of the reference wheel speeds $V_{r1}$ and $V_{r2}$; yaw rate detecting means 10 as yaw motion condition detecting means for detecting a yaw motion condition of the vehicle; reference yaw rate setting means 11 as yaw motion reference value generating means for generating a reference value of the yaw motion condition; correction value setting means 50 for setting a correction value for correcting the first and second reference wheel speeds $V_{r1}$ and $V_{r2}$ according to signals from the yaw rate detecting means 10 and the reference yaw rate setting means 11; and driving wheel torque reducing means 7 for reducing driving torques of the front wheels $W_{fl}$ and $W_{fr}$ in receipt of the control quantity A from the control quantity setting means 2.

The first and second wheel speeds $V_{r1}$ and $V_{r2}$ obtained by the driving wheel slip reference value setting means 1 is input to correcting means 60. The correcting means 60 serves to correct the first and second reference wheel speeds $V_{r1}$ and $V_{r2}$ according to a correction value B·K to be input from the correction value setting means 50 in accordance with the following expressions.

$$V_{r1}=V_{r1}-B \cdot K \tag{6}$$

$$V_{r2}=V_{r2}-B \cdot K \tag{7}$$

The first and second reference wheel speed $V_{r1}$ and $V_{r2}$, after being corrected by the correcting means 60 are input to the control quantity setting means 2. On the other hand, the driving wheel speed $V_w$ obtained by the selecting circuit 9 is also input to the control quantity setting means 2.

The deviation $D_r$ generated from the deviation calculating circuit 12 is input to the absolute value generating circuit 23 for generating an absolute value of the deviation $D_r$. The absolute value of the deviation $D_r$ from the absolute value generating circuit 23 is input to the correction value setting means 50. On the other hand, the reference values $y_D$ and $y_c$ from the permissible deviation setting means 4 are also input to the correction value setting means 50.

The correction value setting means 50 is composed of a correction value computing circuit 24 and a multiplying circuit 25. The absolute value of the deviation $D_r$ and the reference values $y_D$ and $y_c$ are input to the correction value computing circuit 24. The correction value computing circuit 24 serves to conduct the following computation.

$$B=(|D_r|-y_c)/(y_D-y_c) \tag{8}$$

Where, if $(|D_r|-y_c)$ is negative, B=0 is set.

The value B obtained by the correction value computing means 24 is input to the multiplying circuit 25 for multiplying the value B by a constant K to obtain a correction value B·K. The correction value B·K obtained by the multiplying circuit 25 is input to the correcting means 60. If the first and second reference wheel speeds $V_{r1}$ and $V_{r2}$ corrected by the correction value B·K are lower than the vehicle speed $V_v$, they are set to be equal to the vehicle speed $V_v$.

The driving wheel torque reduction control quantity A obtained by the control quantity setting means 2 is input to the driving wheel torque reducing means 7, which in turn reduces the driving wheel torque according to the control quantity A.

According to the second preferred embodiment as mentioned above, the first and second reference wheel speeds $V_{r1}$ and $V_{r2}$ as the reference values for determining a slip condition of the driving wheels are corrected according to a yaw motion condition of the vehicle. Then, the driving wheel torque reduction control quantity A is set according to the first and second reference wheel speeds $V_{r1}$ and $V_{r2}$ after corrected. Then, the driving wheel torque reducing means 7 is operated according to the control quantity A to reduce the driving wheel torque. Accordingly, the driving force may be reduced by reducing the reference values for determining the slip condition according to the yaw motion condition depending on a steering condition of the vehicle. Therefore, a critical lateral force may be increased for the reason as mentioned previously. Thus, a yaw motion depending on a steering quantity of the steering wheel may be effected within a range of the increased critical lateral force.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A driving wheel slip control device for a vehicle during acceleration of the vehicle, comprising:
   first setting means for setting a first driving wheel torque reduction control quantity according to a slip condition of a driving wheel of the vehicle with respect to a driving direction;
   means for detecting a yaw motion condition of the vehicle;
   means for generating a reference value for said yaw motion condition of the vehicle;

second setting means for setting a second driving wheel torque reduction control quantity according to said yaw motion condition and said reference value of said yaw motion condition; and means for determining a final driving wheel torque reduction control quantity according to said first and second driving wheel torque reduction control quantities generated from said first and second setting means, respectively.

2. The driving wheel torque control device as defined in claim 1, wherein said means for deciding the final driving wheel torque reduction control quantity decides the final driving wheel torque reduction control quantity by simply adding said first driving wheel torque reduction control quantity generated from said first setting means to said second driving wheel torque reduction control quantity generated from said second setting means.

3. The driving wheel torque control device as defined in claim 1, wherein said means for deciding the final driving wheel torque reduction control quantity decides the final driving wheel torque reduction control quantity by calculating a square root of sum of square values of said first and second driving wheel torque reduction control quantities generated from said first and second setting means, respectively.

4. A driving wheel slip control device for a vehicle during acceleration of the vehicle, comprising:

means for setting a driving wheel slip reference value for detection of a slip condition of a driving wheel of the vehicle with respect to a driving direction;

means for setting a driving wheel torque reduction control quantity according to said slip condition of said driving wheel;

means for detecting a yaw motion condition of the vehicle;

means for generating a reference value for said yaw motion condition of the vehicle; and means for setting a correction value for correcting said driving wheel slip reference value according to said yaw motion condition and said reference value of said yaw motion condition.

* * * * *